(12) United States Patent
Shimazu et al.

(10) Patent No.: US 9,460,820 B2
(45) Date of Patent: Oct. 4, 2016

(54) RADIATION SHIELDING METHOD AND DEVICE, AND METHOD OF PROCESSING STRUCTURE

(75) Inventors: Yukihide Shimazu, Hyogo (JP); Hiroyuki Mizuma, Hyogo (JP); Kazuhiro Yasumoto, Hyogo (JP); Nobuyuki Hori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 64 days.

(21) Appl. No.: 14/003,186

(22) PCT Filed: Jun. 13, 2012

(86) PCT No.: PCT/JP2012/065085
§ 371 (c)(1),
(2), (4) Date: Sep. 4, 2013

(87) PCT Pub. No.: WO2012/173132
PCT Pub. Date: Dec. 20, 2012

(65) Prior Publication Data
US 2013/0334444 A1     Dec. 19, 2013

(30) Foreign Application Priority Data
Jun. 17, 2011 (JP) ................................. 2011-135697

(51) Int. Cl.
*G21F 3/00* (2006.01)
*G21C 11/02* (2006.01)
*G21C 17/108* (2006.01)

(52) U.S. Cl.
CPC ................. *G21F 3/00* (2013.01); *G21C 11/02* (2013.01); *G21C 17/108* (2013.01); *Y02E 30/40* (2013.01)

(58) Field of Classification Search
CPC ...... Y02E 30/40; G21C 11/00; G21C 11/026; G21C 11/028; G21C 11/02; G21F 7/00; G21F 7/005; G21F 7/01
USPC .................... 250/505.1, 515.1, 517.1–519.1; 376/287, 288, 293
See application file for complete search history.

(56) References Cited

U.S. PATENT DOCUMENTS 3,091,582 A * 5/1963 Bradley ................... G21C 1/18
                                                          122/4 R
3,466,227 A * 9/1969 Finch ....................... G21C 9/00
                                                          250/517.1
(Continued)

FOREIGN PATENT DOCUMENTS

DE    26 13 712 A1    10/1977
JP    50-78793 A       6/1975
(Continued)

OTHER PUBLICATIONS

Korean Office Action dated Aug. 26, 2014, issued in corresponding Korean Application No. 10-2013-7023671; w/English Translation. (16 pages).
(Continued)

*Primary Examiner* — Michael Logie
*Assistant Examiner* — David E Smith
(74) *Attorney, Agent, or Firm* — Westerman, Hattori, Daniels & Adrian, LLP

(57) ABSTRACT

A radiation shielding method and a device, and a method of processing a structure, in which a first radiation-shielded region (A1) is provided by disposing a first radiation-shielding device (100) outside a nuclear reactor vessel (41), a neutron flux detector (77) is moved into the radiation-shielded region (A1) through a conduit tube (65) by moving a thimble tube (68) from the nuclear reactor vessel (41), and an inspection/repair work of the nuclear reactor vessel (41) is then performed, so that an amount of radiation delivered to a worker can be easily and sufficiently reduced.

8 Claims, 9 Drawing Sheets

(56) References Cited

U.S. PATENT DOCUMENTS

| | | | | |
|---|---|---|---|---|
| 3,769,156 A | * | 10/1973 | Brecy | G21C 17/116 376/255 |
| 4,983,351 A | * | 1/1991 | Tower | G21C 17/108 376/203 |
| 5,263,066 A | * | 11/1993 | Szabo | G21C 9/016 376/280 |
| 5,982,839 A | * | 11/1999 | Hatley | G21C 17/017 376/245 |
| 2009/0278063 A1 | * | 11/2009 | Forster | G21F 1/12 250/517.1 |
| 2010/0008463 A1 | * | 1/2010 | Inatomi | G21C 11/022 376/287 |
| 2011/0127451 A1 | * | 6/2011 | Shimazu | G21F 3/00 250/515.1 |

FOREIGN PATENT DOCUMENTS

| | | |
|---|---|---|
| JP | 51-010319 Y1 | 3/1976 |
| JP | 51-117999 U | 9/1976 |
| JP | 51-149494 A | 12/1976 |
| JP | 52-122800 A | 10/1977 |
| JP | 54-22095 A | 2/1979 |
| JP | 57-57285 A | 4/1982 |
| JP | 58-076200 U | 5/1983 |
| JP | 58-161892 A | 9/1983 |
| JP | 58-157083 U | 10/1983 |
| JP | 59-164990 A | 9/1984 |
| JP | 62-105085 A | 5/1987 |
| JP | 62-91291 U | 6/1987 |
| JP | 01-116494 A | 5/1989 |
| JP | 02-013888 A | 1/1990 |
| JP | 02-031196 A | 2/1990 |
| JP | 02-128193 A | 5/1990 |
| JP | 05-232287 A | 9/1993 |
| JP | 06-88899 A | 3/1994 |
| JP | 06-103358 B2 | 12/1994 |
| JP | 09-178879 A | 7/1997 |
| JP | 10-73694 A | 3/1998 |
| JP | 2003-185789 A | 7/2003 |
| JP | 2005-121469 A | 5/2005 |
| JP | 2006-98350 A | 4/2006 |
| JP | 2010-19700 A | 1/2010 |
| JP | 2010-019793 A | 1/2010 |
| JP | 2010-156615 A | 7/2010 |

OTHER PUBLICATIONS

English translation of Written Opinion of International Searching Authority dated Jul. 17, 2012, issued in corresponding International Application No. PCT/JP2012/065085 (6 pages).

International Search Report dated Jul. 17, 2012, issued in corresponding application No. PCT/JP2012/065085.

Written Opinion of the ISA dated Jul. 17, 2012, issued in corresponding application No. PCT/JP2012/065085.

Extended European Search Report dated Jan. 20, 2015, issued in corresponding EP application No. 12801253.1. (7 pages).

Decision of a Patent Grant dated Feb. 16, 2015, issued in corresponding Korean Application No. 10-2013-7023671. Partial English translation (3 pages).

Office Action dated May 12, 2015, issued in counterpart Japanese application No. 2011-135697, with English translation. (11 pages).

Official Decision to Grant a patent dated Oct. 20, 2015 issued in counterpart Japanese patent application No. 2011-135697, with English translation. (5 pages).

Office Action dated May 17, 2016, issued in Japanese Application No. 2015-159306, with English translation (6 pages).

Decision of a Patent Grant dated Aug. 9, 2016, issued in Japanese Application No. 2015-159306, with English translation (3 pages).

\* cited by examiner

RADIATION SHIELDING METHOD AND DEVICE, AND METHOD OF PROCESSING STRUCTURE

FIELD

The present invention relates to, for example, a radiation shielding method, a radiation-shielding device, and a method of processing a structure using the radiation shielding method and the radiation-shielding device that are applied when an inspection work or a repair work is performed in a nuclear power plant.

BACKGROUND

For example, a pressurized water reactor (PWR) in a nuclear power plant uses light water as a nuclear reactor coolant and a neutron moderator, fills an entire reactor core with not-boiled, high-temperature and high-pressure water, transfers the high-temperature and high-pressure water to a steam generator to generate steam by heat exchange, and transfers the steam to a turbine generator to generate power.

Such a nuclear power plant needs a periodical inspection of a structure and the like in order to secure sufficient safety and reliability. If any failure is found out as a result of inspections, a necessary part related to the failure is repaired. When such various works are performed in the nuclear power plant, it is necessary to reduce an amount of radiation acting on a worker.

Examples of such an existing radiation shielding method and a radiation-shielding device are disclosed in Patent Literature 1 described below. In the radiation shielding method and the radiation-shielding device disclosed in Patent Literature 1, shielding is performed such that a hollow vessel is disposed at a predetermined portion of a body to be shielded, a fluid is sent out to the vessel by a fluid sending-out means through a hose while a granular shielding material is supplied to the fluid by a shielding material supply means, so that the shielding material is transferred into the vessel through the hose and the vessel is filled with the shielding material, and the body to be shielded is provided with the vessel filled with the shielding material.

CITATION LIST

Patent Literature

Patent Literature 1: Japanese Patent Application Laid-open No. 2010-156615

SUMMARY

Technical Problem

By the way, an in-core instrumentation nozzle is fixed to a lower part of a nuclear reactor vessel, and an instrumentation guide tube is fixed to an upper end part of the in-core instrumentation nozzle at the in-core side and a conduit tube is fixed to a lower end part at the ex-core side. A neutron flux detector mounted to a tip portion of a thimble tube is inserted to the in-core through the in-core instrumentation nozzle and the instrumentation guide tube from the conduit tube. When an inspection work or a repair work is performed with respect to the in-core instrumentation nozzle in such a structure, the thimble tube constitutes an obstacle and the various works cannot be performed.

Therefore, it is desirable to perform an inspection work or a repair work of the in-core instrumentation nozzle after the thimble tube to which the neutron flux detector is mounted is removed from the nuclear reactor vessel and wound. However, since the neutron flux detector is arranged in the nuclear reactor vessel, an amount of radiation is large and it is difficult to remove it. Conventionally, a neutron flux detector having a large amount of radiation is cut off from the thimble tube, and only a thimble tube having a small amount of radiation is removed, and the neutron flux detector is conveyed with a dedicated vessel outside the reactor, and various works are performed under this state. However, if the neutron flux detector is cut off from the thimble tube, there is a problem that the neutron flux detector cannot be reused and the manufacturing cost is increased.

Further, since the nuclear reactor vessel has a large amount of radiation in its inside, it becomes difficult to apply the above-described previous method of shielding a radiation and radiation-shielding device to the nuclear reactor vessel.

The present invention solves the above-described problems, and an objective of the present invention is to provide a radiation shielding method of shielding a radiation and a device, and a method of processing a structure capable of easily and sufficiently reducing an amount of radiation to which a worker is exposed.

Solution to Problem

According to an aspect of the present invention, a radiation shielding method of shielding a body to be shielded arranged inside a structure, includes the steps of: providing a radiation-shielded region outside the structure; and moving the body to be shielded into the radiation-shielded region from the structure.

Therefore, the radiation-shielded region is provided outside the structure in advance, and the body to be shielded is moved into the radiation-shielded region from the structure and is shielded. The worker is not required to approach the body to be shielded and can easily shield the body to be shielded, and the amount of radiation to which the worker is exposed is sufficiently reduced.

Advantageously, in the radiation shielding method, the structure and the radiation-shielded region are coupled with a curved pipe, and the body to be shielded is moved into the radiation-shielded region from the structure through the pipe.

Therefore, the radiation in the radiation-shielded region from the body to be shielded can be shielded by the curved pipe by moving the body to be shielded in the structure into the radiation-shielded region through the curved pipe.

Advantageously, in the radiation shielding method, the radiation-shielded region is constructed by surrounding a periphery of the region by a hollow vessel, and by filling the vessel with a plurality of shielding material filled jackets in which a number of granular shielding materials are accommodated.

Therefore, the radiation-shielded region that can shield the body to be shielded can be easily disposed by simply filling the vessel with a plurality of shielding material filled jackets.

Advantageously, in the radiation shielding method, the radiation-shielded region is constructed by surrounding the periphery of the region by a hollow vessel, and by supplying a number of granular shielding materials to the vessel along with a fluid.

Therefore, the radiation-shielded region that can shield the body to be shielded can be easily disposed by simply supplying the granular shielding materials to the vessel along with the fluid. In addition, the granular shielding materials can be collected by supplying the fluid to the vessel, and a tail-end process becomes easy. Further, the processing cost can be reduced by allowing the reuse of the shielding materials.

According to another aspect of the present invention, a radiation-shielding device includes: a hollow vessel forming a region having a predetermined size by surrounding a periphery of the region; and a plurality of shielding material filled jackets accommodating a number of granular shielding materials, and filled in the vessel.

Therefore, the radiation-shielded region can be easily disposed, and the amount of radiation to which the worker is exposed can be sufficiently reduced by simply filling the hollow vessel with the plurality of shielding material filled jackets, in which a number of granular shielding materials are accommodated.

Advantageously, in the radiation-shielding device, the vessel includes a first vessel constituting vertical walls of the region and a second vessel constituting a roof of the region, and the first vessel is formed such that a plurality of vertical plates is arranged with a predetermined gap, and the shielding material filled jackets are filled between the plurality of vertical plates.

Therefore, the vertical walls of the region can be constructed by filling the shielding material filled jackets between the plurality of vertical plates vertically arranged with a predetermined gap, whereby the structure can be simplified.

Advantageously, in the radiation-shielding device, a plurality of pipes penetrating the region and guiding the body to be shielded is provided, and a penetrating groove penetrated by the plurality of pipes is formed in the plurality of vertical plates.

Therefore, the body to be shielded can be easily guided to the region by providing the pipe that penetrates the region, and the pipe can be easily guided into the region by forming the penetrating groove in the vertical plates.

Advantageously, in the radiation-shielding device, the second vessel is filled with a plurality of granular shielding materials.

Therefore, the roof of the region can be easily formed by simply filling the second vessel with the granular shielding materials. In addition, the granular shielding materials can be collected by supplying the fluid to the second vessel, and thus, a tail-end process becomes easy, and the processing cost can be reduced by allowing the reuse of the shielding materials.

According to still another aspect of the present invention, a method of processing a structure in which a body to be shielded is arranged, includes the steps of: providing a radiation-shielded region outside the structure; moving the body to be shielded into the radiation-shielded region from the structure; and processing a part to be processed of the structure after the body to be shielded is taken out of the structure.

Therefore, the radiation-shielded region is provided outside the structure in advance, and after the body to be shielded is moved into the radiation-shielded region from the structure, the part to be processed of the structure is processed. Therefore, the worker is not required to approach the body to be shielded, and can easily shield the body to be shielded. The worker can safely process the structure from which the body to be shielded is taken out, and the amount of radiation to which the worker is exposed can be sufficiently reduced.

Advantageously, in the method of processing a structure, the structure and the radiation-shielded region are coupled with a curved pipe, and after the body to be shielded is moved into the radiation-shielded region from the structure through the pipe, an inspection/repair work of the pipe is performed.

Therefore, the radiation in the radiation-shielded region from the body to be shielded can be shielded by the curved pipe and the worker can safely perform the inspection/repair work without being subjected to the radiation from the body to be shielded by moving the body to be shielded into the radiation-shielded region through the curved pipe.

Advantageous Effects of Invention

According to the radiation shielding method and the device, and the method of processing a structure of the present invention, a radiation shielding region is provided outside a structure, and processing of the structure is performed after an object to be shielded is moved from the structure to the radiation shielding region. Therefore, a worker is not required to approach the object to be shielded, and the object to be shielded can be easily shielded, whereby an amount of radiation to which the worker is exposed can be sufficiently reduced.

DESCRIPTION OF EMBODIMENTS

Favorable embodiments of a radiation shielding method and a device according to the present invention will be herein described in detail with reference to the appended drawings. Note that the present invention is not limited by these embodiments, and if there is a plurality of embodiments, the present invention includes one configured from a combination of the embodiments.

EMBODIMENTS

Figure 1:
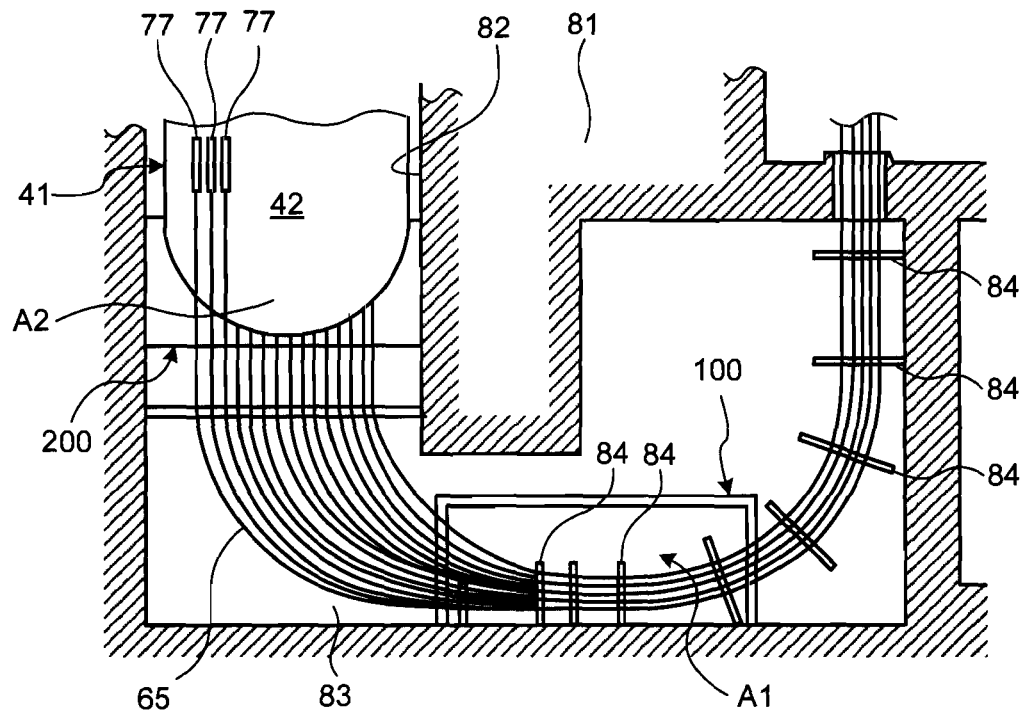
FIG. 1 is a principal part front view of a nuclear reactor plant illustrating a radiation-shielding device according to an embodiment of the present invention.
Figure 2:
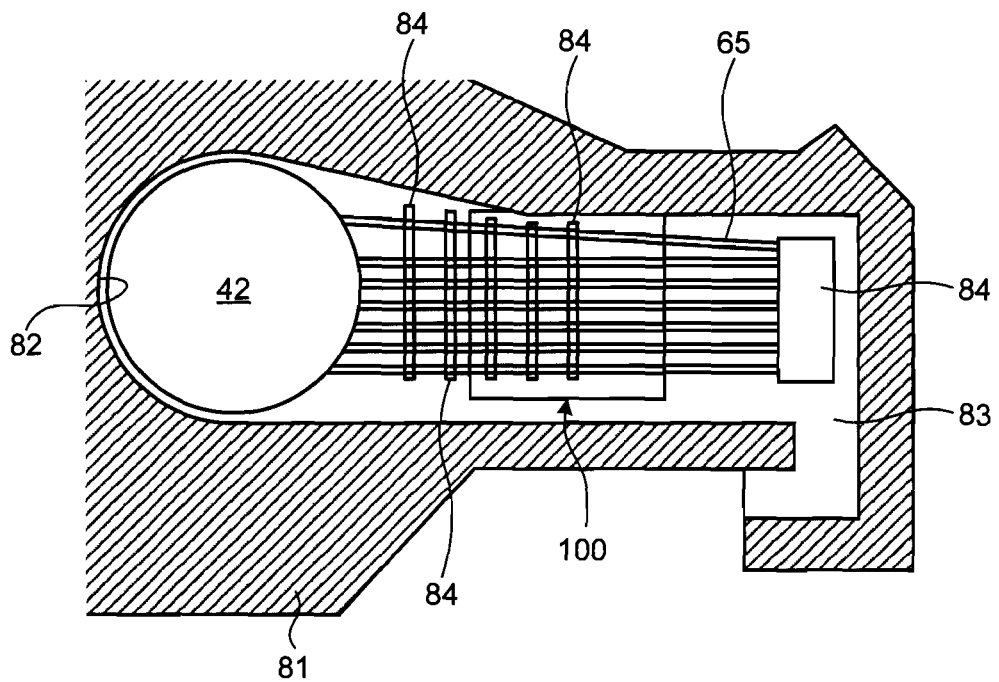
FIG. 2 is a principal part plane view of the nuclear reactor plant illustrating the radiation-shielding device of the present embodiment.
Figure 3:
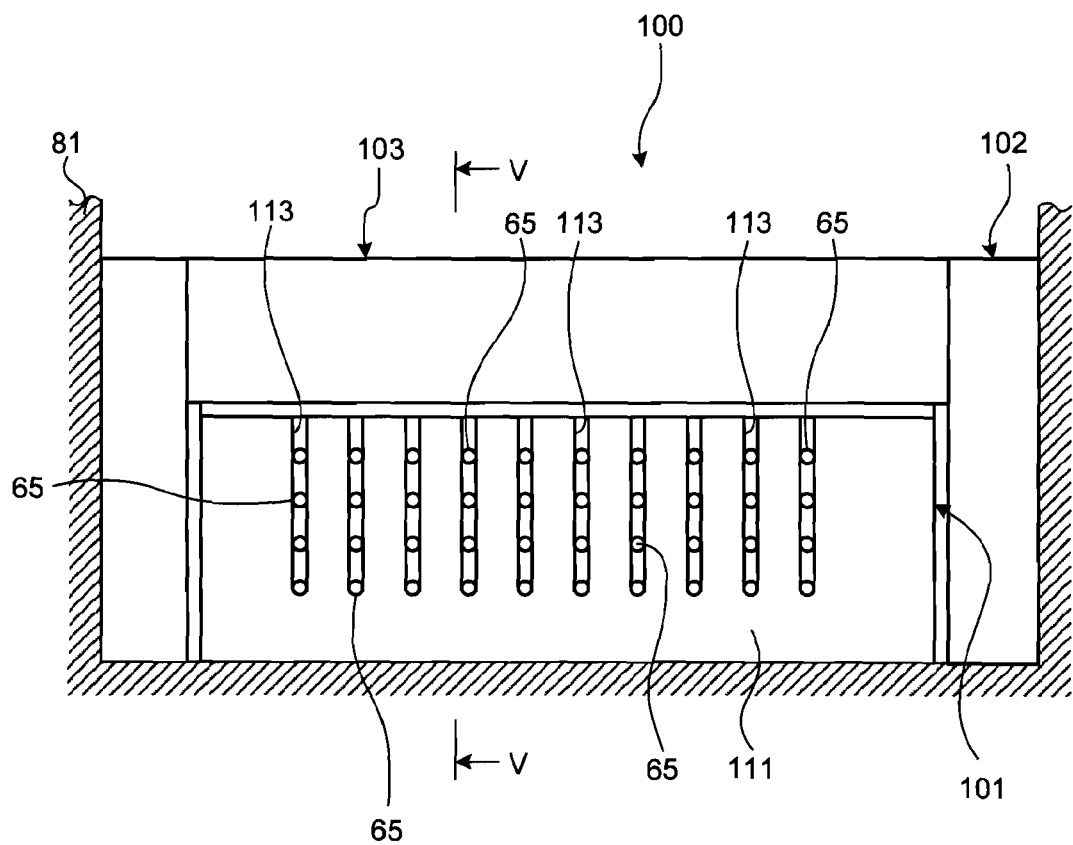
FIG. 3 is a front view illustrating a first radiation-shielding device of the present embodiment.
Figure 4:
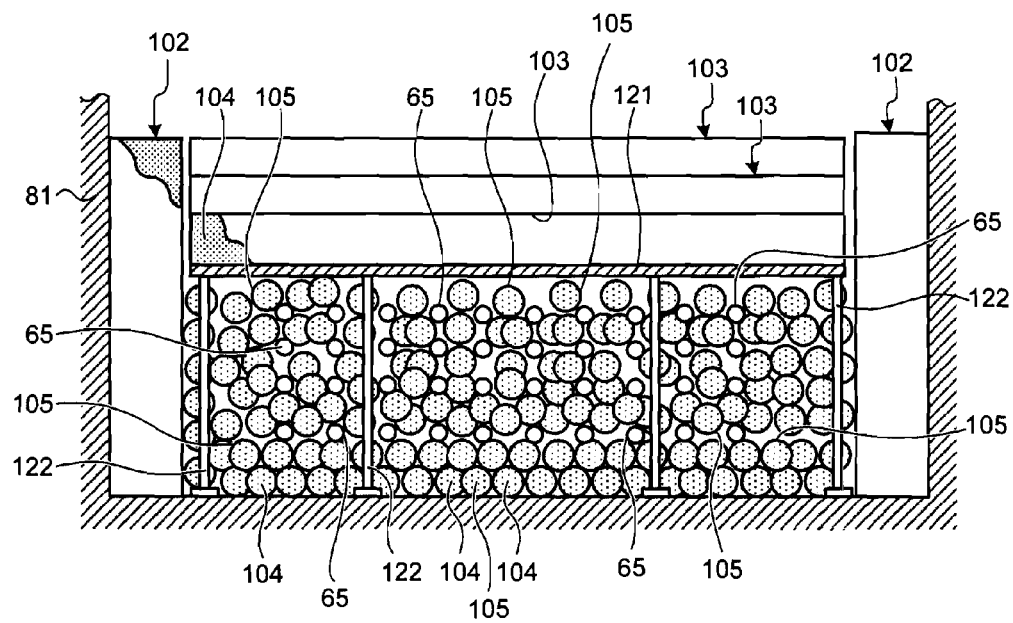
FIG. 4 is a longitudinal sectional view illustrating the first radiation-shielding device of the present embodiment.
Figure 5:
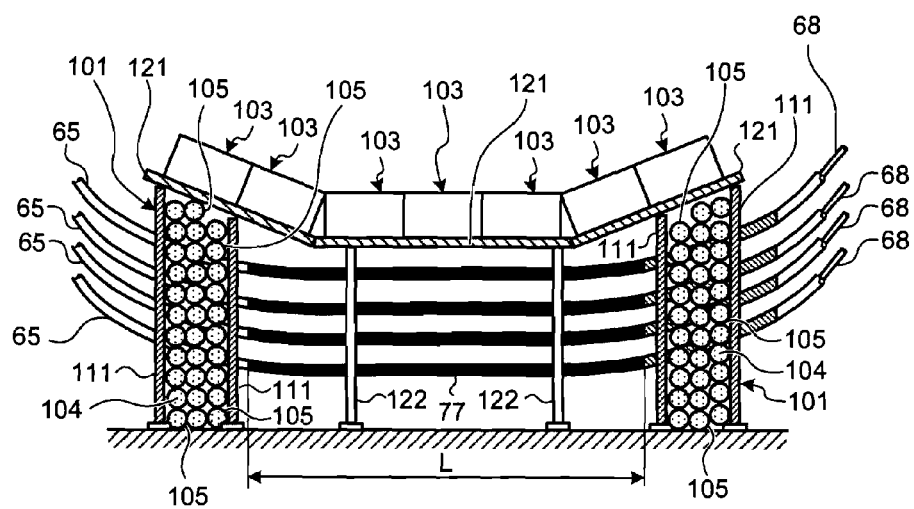
FIG. 5 is a V-V sectional view of FIG. 3 illustrating the first radiation-shielding device of the present embodiment.
Figure 6:
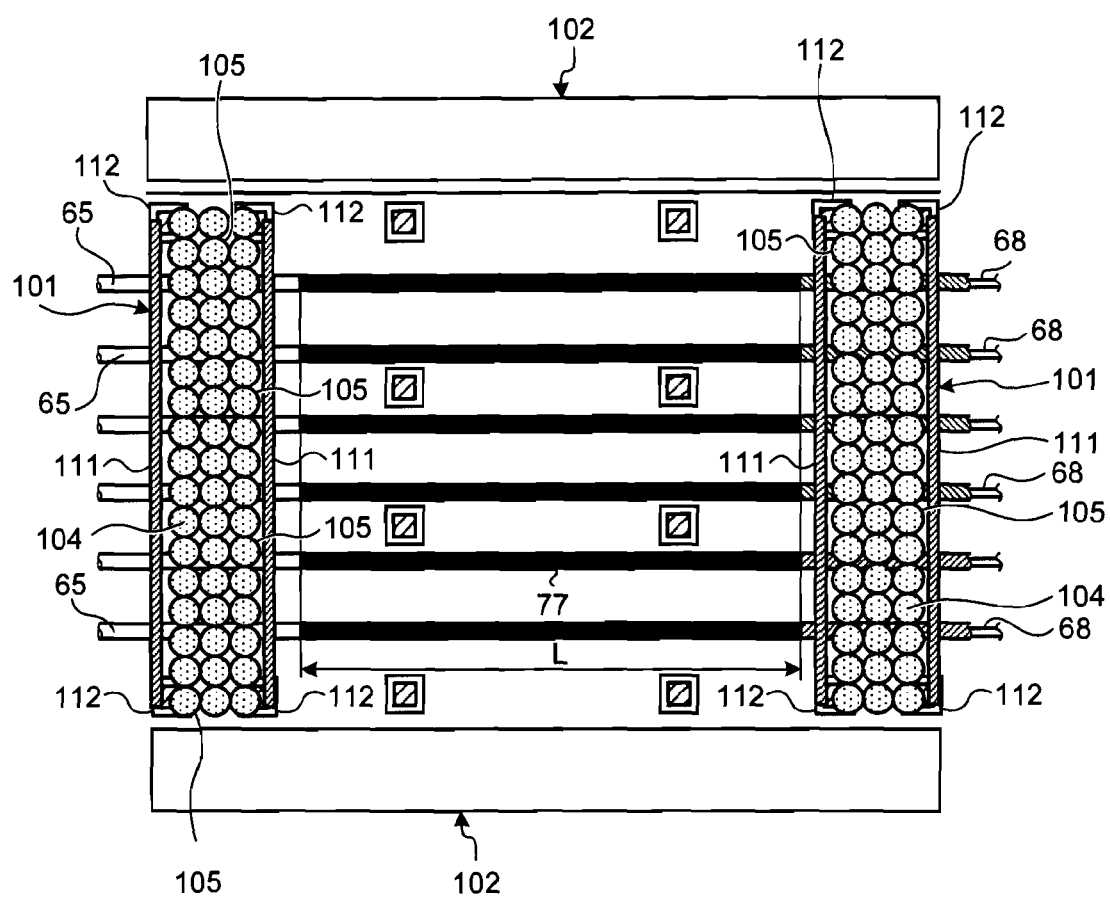
FIG. 6 is a horizontal sectional view illustrating the first radiation-shielding device of the present embodiment.
Figure 7:
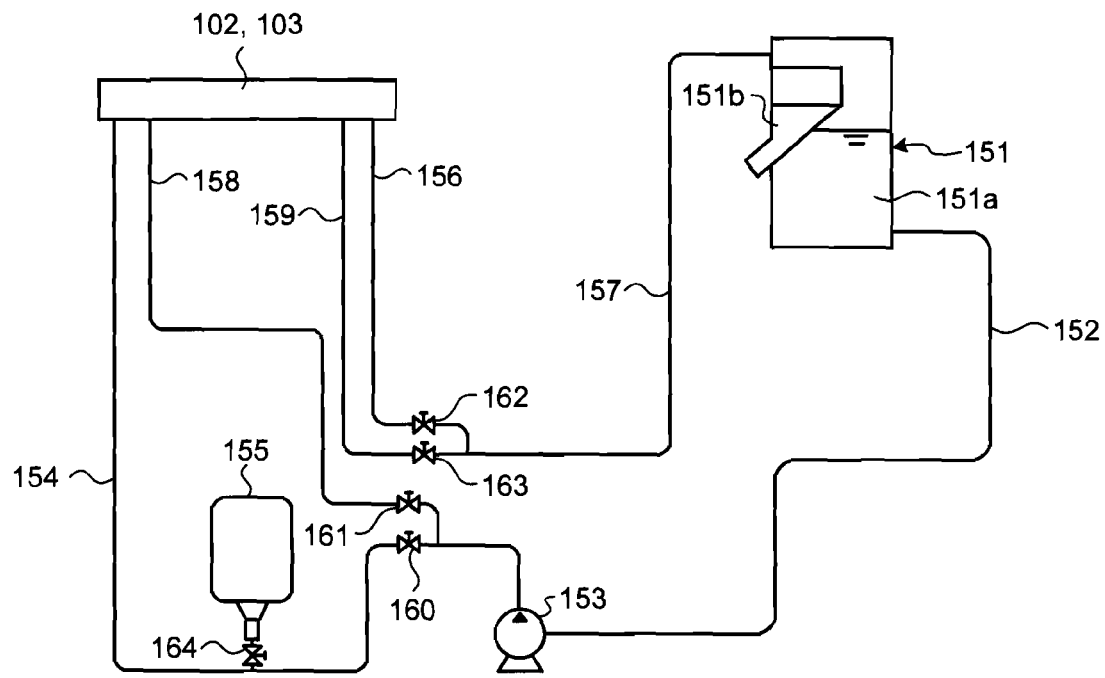
FIG. 7 is a schematic diagram illustrating a supply system and a discharge system of water and a shielding material in the first radiation-shielding device of the present embodiment.
Figure 8:
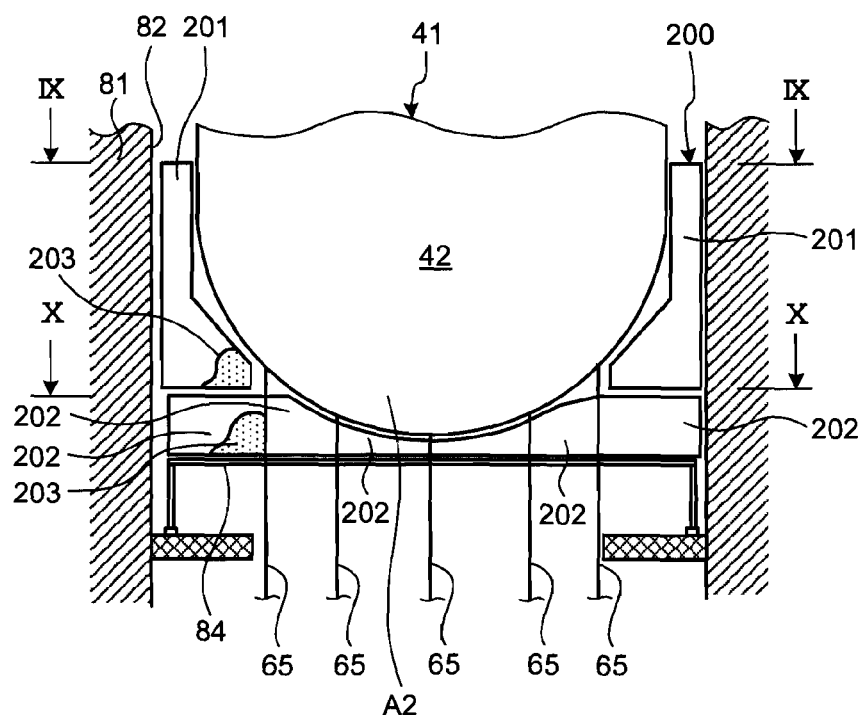
FIG. 8 is a sectional view illustrating a second radiation-shielding device disposed below a nuclear reactor vessel.
Figure 9:
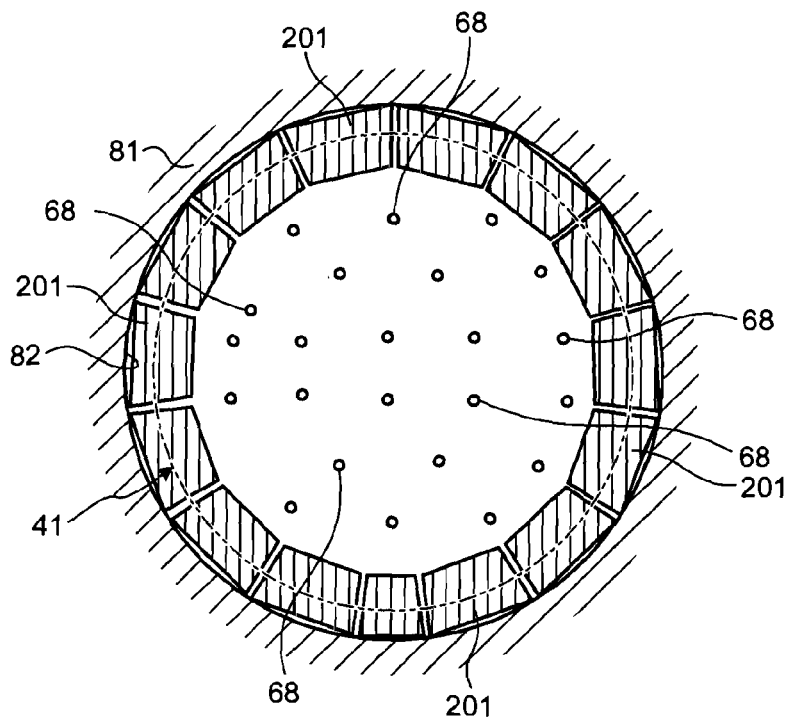
FIG. 9 is an IX-IX sectional view of FIG. 8.
Figure 10:
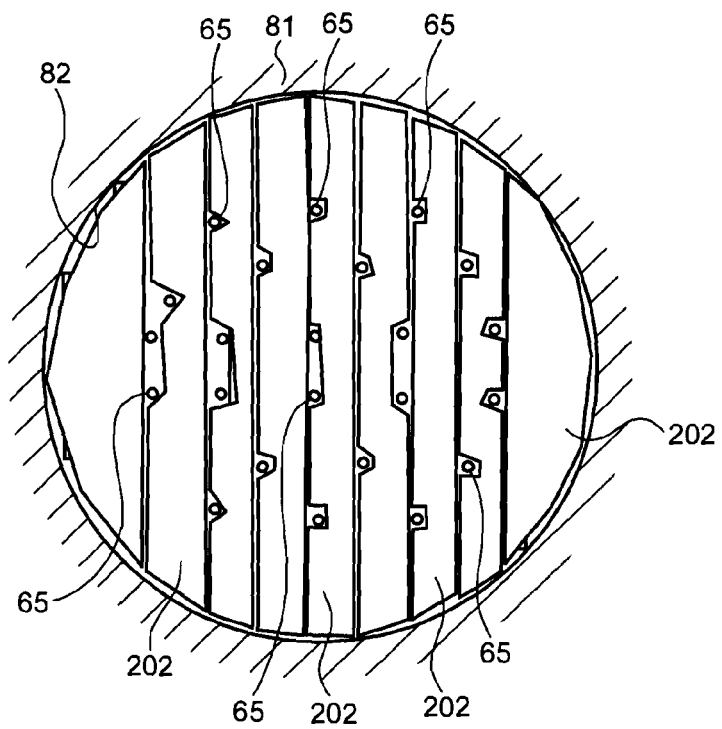
FIG. 10 is an X-X sectional view of FIG. 8.
Figure 11:
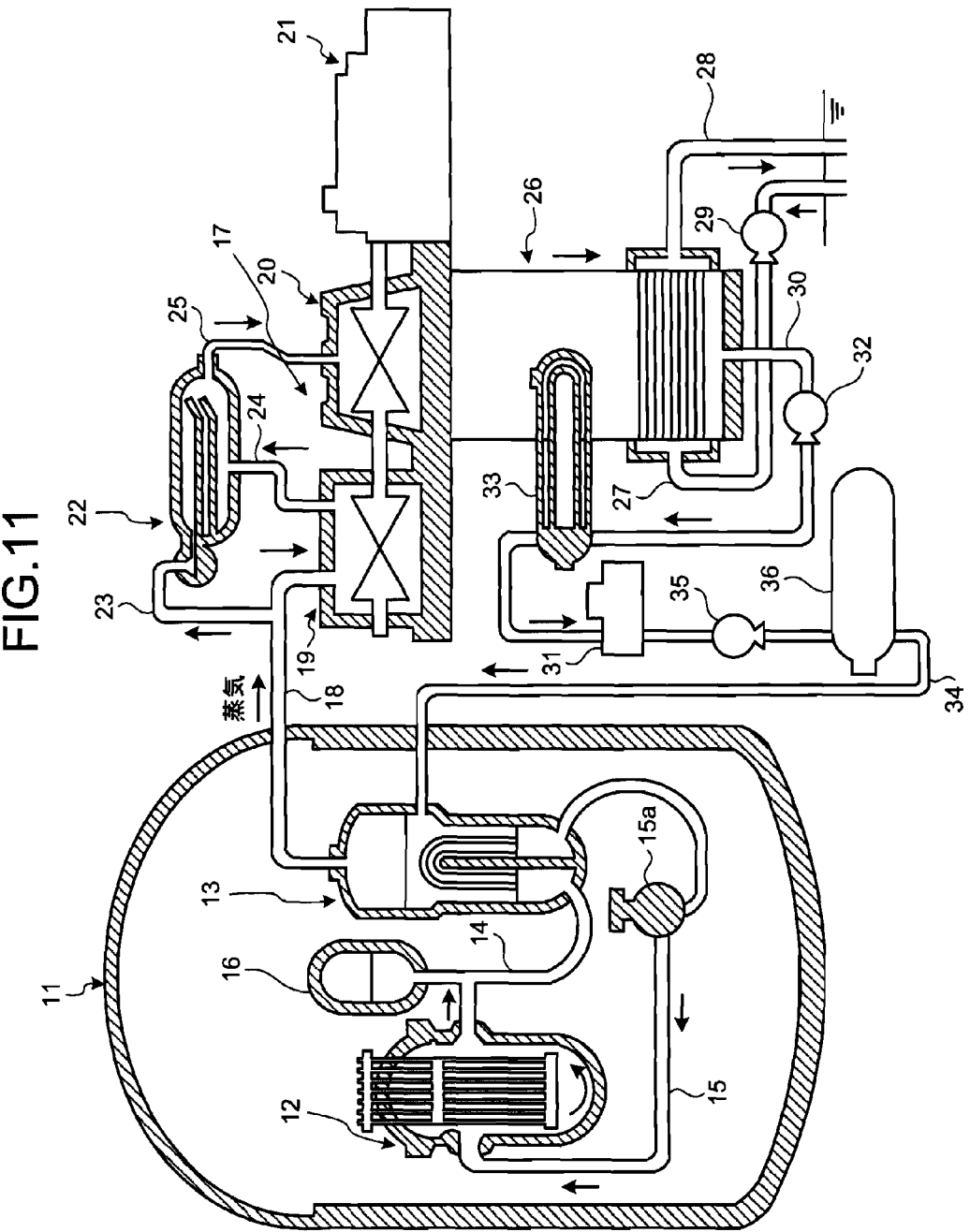
FIG. 11 is a schematic configuration diagram of a nuclear power plant.
Figure 12:
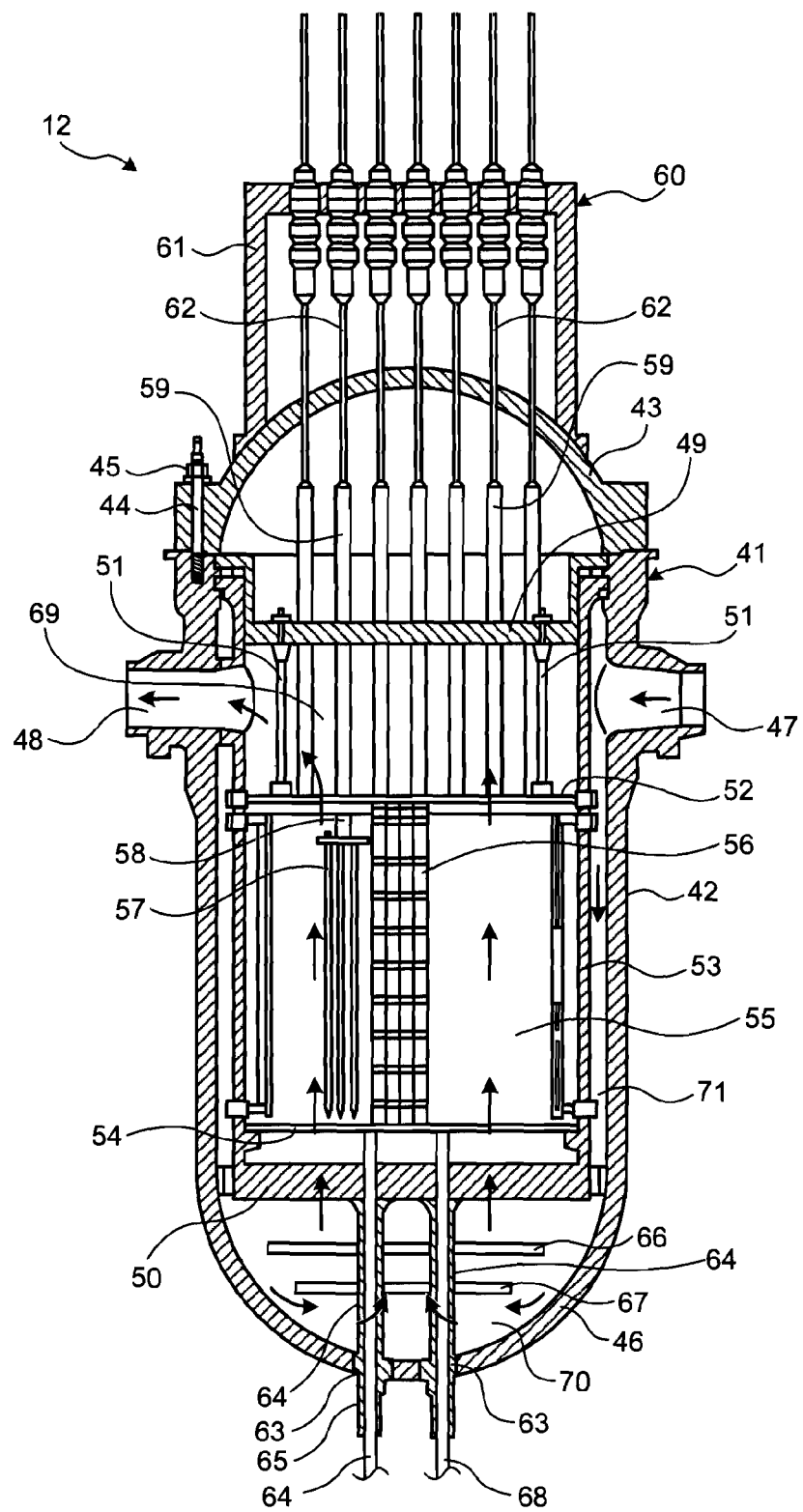
FIG. 12 is a longitudinal sectional view illustrating a pressurized water reactor.
Figure 13:
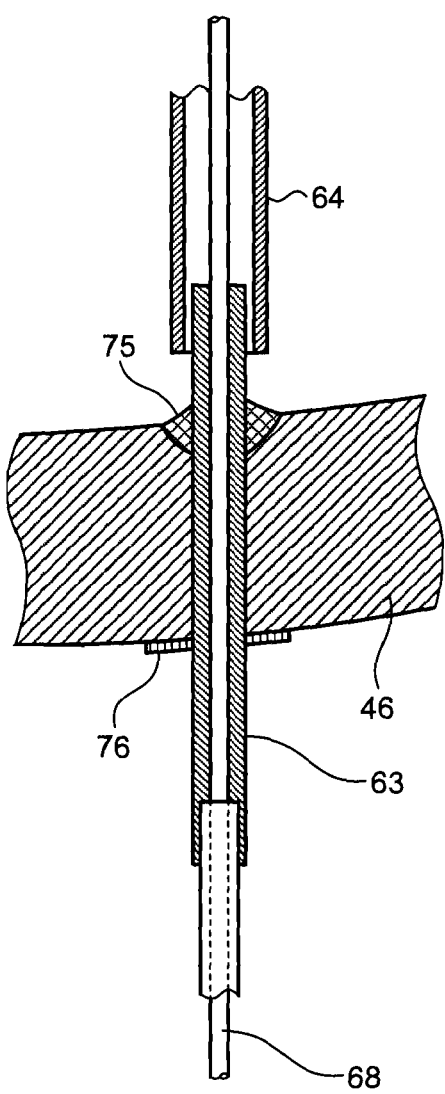
FIG. 13 is a sectional view illustrating an in-core instrumentation nozzle provided at a lower part of the pressurized water reactor.

FIG. 1 is a principal part front view of a nuclear reactor plant illustrating a radiation-shielding device according to an embodiment of the present invention, FIG. 2 is a principal part plane view of the nuclear reactor plant illustrating the radiation-shielding device of the present embodiment, FIG. 3 is a front view illustrating a first radiation-shielding device of the present embodiment, FIG. 4 is a longitudinal sectional view illustrating the first radiation-shielding device of the present embodiment, FIG. 5 is a V-V sectional view of FIG. 3 illustrating the first radiation-shielding device of the present embodiment, FIG. 6 is a horizontal sectional view illustrating the first radiation-shielding device of the present embodiment, FIG. 7 is a schematic diagram illustrating a supply system and a discharge system of water and a shielding material in the first radiation-shielding device of the present embodiment, FIG. 8 is a sectional view illustrating a second radiation-shielding device disposed at a lower part of a nuclear reactor vessel, FIG. 9 is an IX-IX sectional view of FIG. 8, FIG. 10 is an X-X sectional view of FIG. 8, FIG. 11 is a schematic configuration diagram of a nuclear power plant, FIG. 12 is a longitudinal sectional view illustrating a pressurized water reactor, and FIG. 13 is a sectional view illustrating an in-core instrumentation nozzle provided at a lower part of the pressurized water reactor.

A nuclear reactor of the present embodiment is a PWR (pressurized water reactor) that uses light water as a nuclear reactor coolant and a neutron moderator, fills the entire reactor core with not-boiled, high-temperature and high-pressure water, transfers the high-temperature and high-pressure water to a steam generator to generate steam by heat exchange, and transfers the steam to a turbine generator to generate power.

In a nuclear power plant that includes the pressurized water reactor of the present embodiment, as illustrated in FIG. 11, a pressurized water reactor 12 and a steam generator 13 are housed in a containment 11, the pressurized water reactor 12 and the steam generator 13 are coupled via cooling water pipes 14 and 15, the cooling water pipe 14 is provided with a pressurizer 16, and the cooling water pipe 15 is provided with a cooling water pump 15*a*. In this case, light water is used as a moderator and primary cooling water (a coolant), and a primary cooling system maintains a high-pressure condition of about 150 to 160 atmospheres by the pressurizer 16 in order to suppress boiling of the primary cooling water in a reactor core part. Therefore, the light water as the primary cooling water is heated by low-enriched uranium or MOX as fuel (nuclear fuel) in the pressurized water reactor 12, and the high-temperature primary cooling water is transferred to the steam generator 13 through the cooling water pipe 14 with predetermined high pressure maintained by the pressurizer 16. In this steam generator 13, heat exchange is performed between the high-pressure and high-temperature primary cooling water and secondary cooling water, and cooled primary cooling water is returned to the pressurized water reactor 12 through the cooling water pipe 15.

The steam generator 13 is coupled with a steam turbine 17 via a cooling water pipe 18. The steam turbine 17 includes a high-pressure turbine 19 and a low-pressure turbine 20, and is coupled with a generator 21. Further, a moisture separator/heater 22 is provided between the high-pressure turbine 19 and the low-pressure turbine 20, and is connected with a cooling water branch pipe 23 branched from the cooling water pipe 18, while the high-pressure turbine 19 and the moisture separator/heater 22 are coupled with each other by a low-temperature reheat pipe 24, and the moisture separator/heater 22 and the low-pressure turbine 20 are coupled with each other by a high-temperature reheat pipe 25.

Further, the low-pressure turbine 20 of the steam turbine 17 includes a condenser 26, and a water intake pipe 27 and a drain pipe 28 that supplies/discharges cooling water (for example, seawater) are connected to the condenser 26. The water intake pipe 27 includes a circulating water pump 29, and the other ends of the circulating water pump 29 and the drain pipe 28 are arranged in the sea. Further, the condenser 26 is coupled with a deaerator 31 via a cooling water pipe 30, and the cooling water pipe 30 is provided with a condenser pump 32 and a low-pressure feedwater heater 33. The deaerator 31 is coupled with the steam generator 13 via a cooling water pipe 34, and the cooling water pipe 34 is provided with a feed pump 35 and a high-pressure feedwater heater 36.

Therefore, steam generated by heat exchange with the high-pressure and high-temperature primary cooling water in the steam generator 13 is transferred to the steam turbine 17 through the cooling water pipe 18 (from the high-pressure turbine 19 to the low-pressure turbine 20), and the steam turbine 17 is driven by this steam and power is generated by the generator 21. At this time, after the steam from the steam generator 13 drives the high-pressure turbine 19, moisture included in the steam is removed in the moisture separator/heater 22 and heated, and the steam then drives the low-pressure turbine 20. The steam that has driven the steam turbine 17 is then cooled in the condenser 26 using seawater and becomes condensed water, and is heated in the low-pressure feedwater heater 33 by low-pressure steam extracted from the low-pressure turbine 20, for example. Then, after impurities, such as dissolved oxygen and non-condensable gas (ammonia gas), are removed in the deaerator 31, the steam is heated in the high-pressure feedwater heater 36 by high-pressure steam extracted from the high-pressure turbine 19, for example, and is then returned to the steam generator 13.

In the pressurized water reactor 12 constructed in that way, which is applied to a nuclear power plant, a nuclear reactor vessel 41 is, as illustrated in FIG. 12, constructed of a nuclear reactor vessel main body 42 and a nuclear reactor vessel cover (upper mirror) 43 mounted thereabove so that an in-core structure can be inserted inside the nuclear reactor vessel 41. The nuclear reactor vessel cover 43 is openably/closably fixed to the nuclear reactor vessel main body 42 with a plurality of stud bolts 44 and nuts 45.

This nuclear reactor vessel main body 42 has a cylindrical shape, in which an upper part is openable by the nuclear reactor vessel cover 43 being removed and a lower part is blocked by a spherically shaped lower mirror 46. An inlet nozzle (inlet nozzle stub) 47 that supplies the light water (coolant) as primary cooling water and an outlet nozzle (outlet nozzle stub) 48 that discharges the light water are formed at upper parts of the nuclear reactor vessel main body 42. In addition, an injection nozzle (not illustrated) is formed in the nuclear reactor vessel main body 42, other than the inlet nozzle 47 and the outlet nozzle 48.

While an upper core support 49 is fixed above the inlet nozzle 47 and the outlet nozzle 48 in the nuclear reactor vessel main body 42, and a lower core support 50 is fixed in the vicinity of the lower mirror 46 positioned at a lower part of the nuclear reactor vessel main body 42. A number of disk-shaped flow holes (not illustrated) are formed in the upper core support 49 and the lower core support 50. Further, the upper core support 49 is coupled with an upper core plate 52, in which a number of flow holes (not illustrated) is formed, at a lower position via a plurality of core support rods 51.

A cylindrically-shaped core barrel 53 is arranged inside the nuclear reactor vessel main body 42 having a predetermined gap with an inner wall surface. An upper part of the core barrel 53 is connected with the upper core plate 52 and a lower part of the core barrel 53 is connected with a lower core plate 54 in which a number of disk-shaped flow holes (not illustrated) are formed. The lower core plate 54 is supported by the lower core support 50. That is, the core barrel 53 is supported by the lower core support 50 of the nuclear reactor vessel main body 42 in a hanging manner.

The reactor core 55 is formed of the upper core plate 52, the core barrel 53, and the lower core plate 54, and a number of fuel assemblies 56 are arranged in the reactor core 55. The fuel assemblies 56 are, although not illustrated, constructed of a number of fuel rods (not illustrated) bundled by a support lattice in a lattice-like manner, and an upper nozzle is fixed to an upper end part and a lower nozzle is fixed to a lower end part. Further, a number of control rods 57 are arranged inside the reactor core 55. Upper end portions of the large number of control rods 57 are put together to serve as a control rod cluster 58, which can be inserted into the fuel assemblies 57. A number of control rod cluster guide tubes 59 penetrate the upper core support 49 and are fixed to the upper core support 49, and a lower end portion of each of the control rod cluster guide tubes 59 is extended to the control rod cluster 58 in the fuel assemblies 56.

A magnetic-jack control rod driving mechanism 60 is provided on an upper part of the nuclear reactor vessel cover 43 that constitutes the nuclear reactor vessel 41, and is accommodated in a housing 61 that constitutes an integral part with the nuclear reactor vessel cover 43. Upper end parts of the large number of control rod cluster guide tubes 59 are extended to the control rod driving mechanism 60. A control rod cluster driving shaft 62 extended from the control rod driving mechanism 60 passes through the inside of the control rod cluster guide tube 59 and is extended to the fuel assemblies 56, and is capable of holding the control rod cluster 58.

The control rod driving mechanism 60 controls an output of the nuclear reactor by vertically moving, with a magnetic jack, the control rod cluster driving shaft 62 vertically extended and coupled with the control rod cluster 58 and having a plurality of circumferential grooves provided in a surface with equal pitches in a longitudinal direction.

Further, as illustrated in FIG. 13 in detail, the nuclear reactor vessel main body 42 is provided with a number of instrumentation nozzles 63 that penetrate the lower mirror 46. An in-core instrumentation guide tube 64 is fixed to an upper end part of each instrumentation nozzle 63 positioned at an in-core side and a conduit tube 65 is connected to a lower end part positioned at an ex-core side. An upper end part of each in-core instrumentation guide tube 64 is connected to the lower core support 50, and upper and lower connection plates 66 and 67 for suppressing vibration are attached thereto. A neutron flux detector (illustration is omitted) capable of measuring a neutron flux is mounted on a thimble tube 68. The thimble tube 68 passes through the conduit tube 65, the instrumentation nozzle 63, and the in-core instrumentation guide tube 64, penetrates the lower core plate 54, and can be inserted into the fuel assemblies 56.

Therefore, the control rod cluster driving shaft 62 is moved by the control rod driving mechanism 60 and the control rods 57 are inserted to the fuel assemblies 56, so that nuclear fission in the reactor core 55 is controlled. The light water filled in the nuclear reactor vessel 41 is heated by generated thermal energy, and high-temperature light water is discharged from the outlet nozzle 48 and is sent to the steam generator 13, as described above. That is, neutrons are released by the nuclear fuel, which constitutes the fuel assemblies 56, being subjected to nuclear fission. The light water as the moderator and the primary cooling water reduces kinetic energy of the released fast neutrons and causes them to be thermal neutrons, so that new nuclear fission is facilitated and the generated heat is taken and cooled. Further, the number of neutrons generated in the reactor core 55 is adjusted by insertion of the control rods 57 to the fuel assemblies 56, and the control rods 57 are rapidly inserted to the reactor core 55 when the nuclear reactor is urgently stopped.

Further, an upper plenum 69 that communicates into the outlet nozzle 48 is formed above the reactor core 55 and a lower plenum 70 is formed below the reactor core 55 in the nuclear reactor vessel 41. Further, a downcomer unit 71 that communicates into the inlet nozzle 47 and the lower plenum 70 is formed between the nuclear reactor vessel 41 and the core barrel 53. Therefore, the light water flows into the nuclear reactor vessel main body 42 from the inlet nozzle 47, and flows downward in the downcomer unit 71 and reaches the lower plenum 70. The light water is then guided upward by a spherically shaped inner surface of the lower plenum 70 and goes upward, passes through the lower core support 50 and the lower core plate 54, and then flows into the reactor core 55. The light water, which has flown into the reactor core 55, cools the fuel assemblies 56 by absorbing the thermal energy generated from the fuel assemblies 56, which constitute the reactor core 55. The light water is raised to high temperature, passes through the upper core plate 52 and goes upward to the upper plenum 69, and passes through the outlet nozzle 48 and is discharged.

In the nuclear reactor vessel 41 constructed in this way, the instrumentation nozzle 63 penetrates the lower mirror 46 of the nuclear reactor vessel main body 42, and an upper and lower parts are fixed by welding (Inconel building up) 75 and 76. Therefore, a periodical inspection and repair are required for the welded parts 75 and 76. In this case, the thimble tube 68 is inserted into the instrumentation nozzle 63. Thus, it is necessary to remove the thimble tube 68 in advance. However, the neutron flux detector 77 is mounted to a tip portion of the thimble tube 68, and the tip portion of the thimble tube 68 and the neutron flux detector 77 have a large amount of radiation. Therefore, handling thereof is difficult.

Therefore, the radiation shielding method of the present embodiment is, as illustrated in FIGS. 1 and 2, a method of shielding the neutron flux detector 77 and the tip portion of the thimble tube 68 as bodies to be shielded arranged inside the nuclear reactor vessel 41 (nuclear reactor vessel main body 42) as the structure. The method includes the steps of providing a radiation-shielded region A1 outside the nuclear reactor vessel 41, and moving the neutron flux detector 77 to the radiation-shielded region A1 from the nuclear reactor vessel 41.

In this case, the nuclear reactor vessel 41 and the radiation-shielded region A1 are coupled with the conduit tube 65 as a curved pipe, and the neutron flux detector 77 is moved to the radiation-shielded region A1 from the nuclear reactor vessel 41 through the conduit tube 65.

Further, the method of processing the nuclear reactor vessel (structure) 41 of the present embodiment is a method of performing an inspection task or a repair work of the instrumentation nozzle 63 fixed to the lower mirror 46 of the nuclear reactor vessel main body 42 with welding (Inconel building up) 75 and 76. The method includes the steps of providing the radiation-shielded region A1 outside the nuclear reactor vessel 41, moving the neutron flux detector 77 into the radiation-shielded region A1 from the nuclear reactor vessel 41, and performing an inspection task or a repair work of the instrumentation nozzle 63 (see FIG. 12) after the neutron flux detector 77 is taken out of the nuclear reactor vessel 41.

That is, the nuclear reactor vessel 41 is supported by a concrete structure 81 disposed on a solid ground such as bedrock. The nuclear reactor vessel 41 is arranged in a cylindrical part 82 formed in this concrete structure 81, and is hung and supported. A cavity 83 is positioned and formed below the nuclear reactor vessel 41 in the concrete structure 81. One end parts of a number of conduit tubes 65 are connected to a lower part of the nuclear reactor vessel 41, and are arranged bending in the cavity 83, and the other ends are extended upward. The large number of conduit tubes 65 are supported to a floor surface and a wall surface of the cavity 83 by a plurality of support members 84.

The neutron flux detector 77 is mounted to a tip portion of the thimble tube 68 (see FIG. 13), is inserted from the side of the other end of the conduit tube 65, and is arranged in the nuclear reactor vessel 41 during an operation of the nuclear reactor. Radioactive substances attach to the tip portion of the thimble tube 68, which includes the neutron flux detector 77, along a predetermined length, and an amount of radiation is high. In the present embodiment, a first radiation-shielding device 100 shields the tip portion of the thimble tube 68 including the neutron flux detector 77 taken out of the nuclear reactor vessel 41, and is disposed to configure the radiation-shielded region A1 on the floor surface of the cavity 83 outside the nuclear reactor vessel 41. Further, a second radiation-shielding device 200 is arranged to shield a radiation-shielded region A2 existing inside the nuclear reactor vessel 41 in order to secure a work area below the nuclear reactor vessel 41.

The first radiation-shielding device 100 is constructed of, as illustrated in FIGS. 3 to 6, a hollow first vessel 101 and second vessels 102 and 103 that form the radiation-shielded region A1 having a predetermined size by surrounding its periphery, a plurality of shielding material filled jackets 105, in which a number of granular shielding materials 104 are accommodated, and filled in the first vessel 101, and a number of granular shielding materials 104 filled in the second vessels 102 and 103.

In this case, two first vessels 101 constitute a pair of vertical walls at sides perpendicular to the conduit tubes 65, two second vessels 102 constitute a pair of vertical walls on sides along the conduit tube 65, and seven second vessels 103 constitute a roof. Further, the large number of conduit tubes 65 penetrate the first vessel 101.

The first vessel 101 is formed into a hollow shape in which two vertical plates 111 are vertically arranged with a predetermined gap and are fixed by four support frames 112. A plurality of penetrating grooves 113 opening upward along an up and down direction is aligned in a right and left direction and is formed in each of the vertical plates 111. The penetrating grooves 113 can be penetrated by a plurality of conduit tubes 65, and are used to vertically arrange the vertical plates 111 in a direction perpendicular to a longitudinal direction of the conduit tubes 65 while avoiding the conduit tubes 65. Note that the gap between the two vertical plates 111 is set according to an amount of radiation of an object to be shielded (the neutron flux detection apparatus 77 and the tip portion of the thimble tube 68), and further to the quality of the material and the weight of the shielding material 104.

These two first vessels 101 have similar constructions, and are arranged perpendicular to the longitudinal direction of the conduit tubes 65 with a predetermined gap. The distance between the two first vessels 101 is slightly longer than the length that constitutes the radiation-shielded region A1, i.e., slightly longer than the length of the thimble tube 68 including the neutron flux detector 77 arranged in the nuclear reactor vessel 41.

The second vessel 102 is formed in a hollow manner, and is constructed of a rigid body such as stainless steel and a material having flexibility and elasticity such as plastic and urethane rubber, for example. The second vessel 102 can secure high rigidity by being constructed of stainless steel and plastic. Meanwhile, by being constructed of urethane rubber, the second vessel 102 is suitable for transportation because it can be folded small due to its flexibility, and can be adhered to a predetermined position due to its elasticity. Note that, in the present embodiment, the second vessels 102 are arranged on the floor surface to be adjacent to the first vessels 101. Therefore, it is desirable to stabilize its shape by being constructed of stainless steel and plastic.

These two second vessels 102 have similar constructions, and are arranged at both sides of the conduit tubes 65 with a predetermined gap to be parallel with the longitudinal direction of the conduit tubes 65. The two first vessels 101 are desirably arranged such that end portions in the horizontal direction adhere to end portions of the first vessels 101.

The two first vessels 101 and the two second vessels 102 constitute four vertical walls, and a plurality of roof plates 121 are placed above the vessels 101 and 102. The roof plates 121 are supported by a plurality of vertical plates 111 and a plurality of supports 122. End parts of the roof plates 121 are in a sloping state in accordance with curved shapes of the conduit tubes 65. The roof plates 121 are desirably connected with the vertical plates 111 and the supports 122 with bolts (not illustrated) or by welding, as needed.

The second vessel 103 is formed, similarly to the second vessel 102, in a hollow manner, and is constructed of a rigid body such as stainless steel and a material having flexibility and elasticity such as plastic and urethane rubber, for example. The six second vessels 103 have similar constructions, and are placed on upper parts of the roof plates 121 to adhere to each other. Note that, in the present embodiment, the second vessels 103 are arranged on the upper parts of the roof plates 121. Therefore, it is desirable to reduce the weight by being constructed of urethane rubber.

The first vessel 101 is filled with a plurality of shielding material filled jackets 105, and the second vessels 102 and 103 are filled with a number of shielding materials 104. It is desirable to apply, to the shielding material 104, granulated pellets containing tungsten that is made by hardening tungsten powders with a resin material, granulated stainless steel grains obtained by processing stainless steel, granulated lead grains obtained by processing lead, depleted uranium grains obtained by granulating depleted uranium, and the like. It is favorable to uniformly form the shape and size of particles of the shielding material 104 in order to uniform accumulation in the second vessels 102 and 103.

The shielding material filled jacket 105 is a pouch-shape vessel, and is constructed of a material having fixed strength as well as flexibility and elasticity. For example, the shielding material filled jacket 105 is desirably formed of aramid fiber (aromatic polyamide resin), or may be formed of plastic or rubber. The shielding material filled jacket 105 is filled with the shielding materials 104. Therefore, the shielding material filled jacket 105 can freely change the shape. When filled in the first vessel 101, the shielding material filled jacket 105 is deformed in accordance with the shape of its surroundings and the shape of adjacent shielding material filled jackets 105, so that the shielding material filled jacket 105 can be filled in a space of the first vessel 101 without any gap. In this case, the first vessel 101 is constructed of a plurality of vertical plates 111 that has the penetrating grooves 113. Therefore, the shielding material filled jacket 105 is desirably set to have a size not to come out of the penetrating grooves 113.

Here, a supply system and a discharge system of water and a shielding material with respect to the second vessels 102 and 103 of the first radiation-shielding device 100 will be described. As illustrated in FIG. 7, the supply system of the shielding material with respect to the second vessels 102 and 103 includes a tank unit 151, a first supply pipe 152, a pump 153, a second supply pipe 154, a shielding material supply hopper 155, a first discharge pipe 156, and a second discharge pipe 157. Meanwhile, the discharge system of the shielding material with respect to the second vessels 102 and 103 includes the tank unit 151, the first supply pipe 152, the pump 153, a third supply pipe 158, and a third discharge pipe 159. Further, changeover valves 160 and 161 that switch the second supply pipe 154 and the third supply pipe 158 are provided, and changeover valves 162 and 163 that switch the first discharge pipe 156 and the third discharge pipe 159 are provided.

The tank unit 151 includes a water storage part 151a that supplies water to the second vessels 102 and 103 and stores water discharged from the second vessels 102 and 103, and a separation part 151b that separates a shielding material returned from the second vessels 102 and 103. In this case, water may just be a fluid, and pure water, boric acid solution, polyvinyl alcohol, silicone oil, air, and the like are applicable other than water.

The shielding material supply hopper 155 stores the shielding material (104 and 203) and allows the shielding materials to fall from a funnel-shaped openable bottom slot by a fixed quantity. The shielding material supply hopper 155 has the shielding material connected downstream of the pump 153 in the second supply pipe 154, and an on-off valve 164 is provided at the connection.

Note that a filter from which only water is discharged and the shielding material is not discharged is provided at a connection between the second vessels 102 and 103 and the first discharge pipe 156. In addition, not only water but also the shielding material are discharged to a connection between the second vessels 102 and 103 and the third discharge pipe 159.

Further, the second radiation-shielding device 200 surrounds a lower part of the nuclear reactor vessel 41 as the radiation-shielded region A2, as illustrated in FIGS. 8 to 10, and includes a hollow third vessel 201 that covers a lower periphery of the nuclear reactor vessel 41, a hollow fourth vessel 202 that covers a lower part of the nuclear reactor vessel 41, and a number of granular shielding materials 203 filled in the vessels 201 and 202.

The third vessel 201 is formed in a hollow manner, and is constructed of, for example, a rigid body such as stainless steel and a material having flexibility and elasticity such as plastic and urethane rubber. The third vessel 201 has a shape in which the lower part is gradually increased in thickness to block a gap between the cylindrical part 82 of the concrete structure 81 and the nuclear reactor vessel 41. A plurality of the third vessels 201 is arranged aligning and adhering to each other at an outside of the nuclear reactor vessel 41 along a circumferential direction. Also, the fourth vessel 202 is formed in a follow manner, and is constructed of, for example, a material having flexibility and elasticity, such as stainless steel, plastic, and urethane rubber. The fourth vessel 202 is formed in a rod-shaped manner to block a gap between the nuclear reactor vessel 41 and a support table 84 supported by the concrete structure 81, and a plurality of the fourth vessels 202 is arranged aligning and adhering to each other at a lower side of the nuclear reactor vessel 41. In this case, the plurality of fourth vessels 202 has a shape to avoid the plurality of conduit tubes 65, and is formed into a circle by adhering to each other. Note that, in the present embodiment, the third and fourth vessels 201 and 202 are arranged above the support table 84. Therefore, it is desirable to reduce the weight and to have flexibility and elasticity by being constructed of urethane rubber.

The vessels 201 and 202 are filled with a number of shielding materials 203. It is desirable to apply, to the shielding material 203, similarly to the shielding material 104, granulated pellets containing tungsten made by hardening tungsten powders with a resin material, granulated stainless steel grains obtained by processing stainless steel, granulated lead grains obtained by processing lead, depleted uranium grains obtained by granulating depleted uranium, and the like. Further, it is favorable to uniformly form the shape and size of particles of the shielding material 104 in order to uniform accumulation in the second vessels 102 and 103.

Note that a supply system and a discharge system of water and the shielding material with respect to the third and fourth vessels 201 and 202 of the second radiation-shielding device 200 is similar to those of the second vessel 102 and 103 of the first radiation-shielding device 100. Therefore, detailed description is omitted.

Hereinafter, a radiation shielding method and a method of processing the nuclear reactor vessel 41 by the first and second radiation-shielding devices 100 and 200 will be described.

First, as illustrated in FIGS. 1 and 2, the second radiation-shielding device 200 is disposed below the nuclear reactor vessel 41, so that the work area below the second radiation-shielding device 200 is shielded from the radiation-shielded region A2. In this case, the third and fourth vessels 201 and 202 are arranged at predetermined positions, and water and the shielding material are supplied thereto while only the water is discharged therefrom, so that the shielding material is filled in the third and fourth vessels 201 and 202. Therefore, the second radiation-shielding device 200 is disposed below the nuclear reactor vessel 41, and the work area below the second radiation-shielding device 200 is shielded from the radiation-shielded region A2.

Next, the first radiation-shielding device 100 that shields the neutron flux detector 77 and the thimble tube 68 taken out of the nuclear reactor vessel 41 is disposed in the cavity 83 of the concrete structure 81. That is, as illustrated in FIGS. 3 to 6, a worker enters the cavity 83, and vertically arranges the four vertical plates 111 at predetermined positions so that the plurality of conduit tubes 65 are inserted into the penetrating grooves 113, and fixes the vertical plates 111 with the support frames 112. With this work, the two first vessels 101 that serve as the two vertical walls perpendicular to the longitudinal direction of the plurality of conduit tubes 65 are formed. Next, the two second vessels 102 are arranged at both sides of the plurality of conduit tubes 65 to adhere to the first vessels 101.

Then, the plurality of shielding material filled jackets 105 is filled in the first vessels 101. In this case, the large number of shielding material filled jackets 105 are deformable. Therefore, when filled in the first vessels 101, the shielding material filled jackets 105 are deformed in accordance with the shapes of the inner wall surfaces of the first vessels 101, the plurality of conduit tubes 65, and other shielding material filled jackets 105, and are filled in the first vessels 101 without any gap. Further, the shielding material filled jacket 105 is set to be a predetermined size. Therefore, the shielding material filled jacket 105 blocks the penetrating grooves 113 not to come out of the penetrating grooves 113 of the vertical plates 111. Note that, in FIGS. 4 to 6, the shielding material filled jacket 105 is described in a circular shape. However, in reality, it is deformed and is filled in the first vessels 101 without any gap.

When the four vertical walls are formed by the two first vessels 101 and the two second vessels 102, the plurality of roof plates 121 is placed above the vessels 101 and 102. Following that, the six second vessels 103 are arranged adhering to each other on the upper part of the roof plates 121. Then, as illustrated in FIG. 7, the supply pipes 154 and 158, and the discharge pipes 156 and 159, as the supply system and the discharge system of water and the shielding material, are connected to the second vessels 102 and 103, and the changeover valves 160 and 162 are released.

By operating the pump 153 under this state, water in the tank unit 151 is supplied to the second vessels 102 and 103 through the first and second supply pipes 152 and 154, and the second vessels 102 and 103 are filled with water. Following that, by releasing the on-off valve 164, the shielding material is supplied to the second supply pipe 154 from the shielding material supply hopper 155. Accordingly, the shielding material is sent to the second vessels 102 and 103 along with water, so that the shielding material is gradually accumulated in a bottom part. Meanwhile, the water supplied to the second vessels 102 and 103 is returned to the tank unit 151 through the first and second discharge pipes 156 and 157, and is circulated.

When the shielding material is sufficiently filled in the second vessels 102 and 103, the operation of the pump 153 is stopped and the changeover valves 160 and 162 are closed. Therefore, the supply of the water and the shielding material to the second vessels 102 and 103 is stopped. As a result, the second vessels 102 and 103 are filled with the water and the shielding material by a proper amount.

In this way, the plurality of shielding material filled jackets 105 is filled in the first vessels 101 and a number of shielding materials are filled in the second vessels 102 and 103, so that the radiation-shielded region A1 is constructed by the first radiation-shielding device 100.

When the radiation-shielded region A1 is constructed in the cavity 83 by the first radiation-shielding device 100, the worker is evacuated from the cavity 83. Then, as illustrated in FIGS. 5 and 6, by moving each thimble tube 68 along the conduit tube 35, the neutron flux detector 77 and the thimble tube 68 having a large amount of radiation are taken out of the nuclear reactor vessel 41, and are moved into the radiation-shielded region A1 shielded by the first radiation-shielding device 100. In this case, the neutron flux detector 77 and the thimble tube 68 having a large amount of radiation have the length L, and can be adequately accommodated in the radiation-shielded region A1.

In this way, the neutron flux detector 77 and the thimble tube 68 having a large amount of radiation are taken out of the nuclear reactor vessel 41 and are accommodated in the radiation-shielded region A1. At this time, since the first radiation-shielding device 100 is constructed of the shielding materials 104, the radiation does not leak from the neutron flux detector 77 and the tip portion of the thimble tube 68. In addition, the front and rear portions of the conduit tube 65 at both first vessel 101 sides, through which the neutron flux detector 77 and the tip portion of the thimble tube 68 are guided, are curved. Therefore, the radiation does not leak through the conduit tube 65.

Then, the operator accesses, from above, the nuclear reactor vessel 41, of which the neutron flux detector 77 and the thimble tube 68 are taken out, and performs an inspection task or a repair task of the instrumentation nozzle 63 (see FIG. 13) of the nuclear reactor vessel 41. In this case, since the fourth vessels 202 of the second radiation-shielding device 200 impede the various works for the instrumentation nozzle 63 of the nuclear reactor vessel 41, the impeditive fourth vessels 202 may be deformed to shrivel by removing a predetermined amount or all of the shielding materials 203.

Following that, when the inspection task or the repair work for the instrumentation nozzle 63 of the nuclear reactor vessel 41 is completed, the neutron flux detector 77 and the thimble tube 68 are returned to the nuclear reactor vessel 41, and the radiation-shielding devices 100 and 200 are removed.

That is, first, the thimble tubes 68 are moved along the conduit tubes 65 in a reverse direction of the above description, so that the neutron flux detector 77 and the thimble tube 68 in the radiation-shielded region A1 are moved into the nuclear reactor vessel 41. Then, as illustrated in FIG. 7, the changeover valves 161 and 163 are released and the pump 153 is operated, so that the water in the tank unit 151 is supplied to the second vessels 102 and 103 through the first and third supply pipes 152 and 158, and the water and the shielding material filled in the second vessels 102 and 103 are returned to the tank unit 151 through the second discharge pipes 159 and 157.

When all of the shielding materials in the second vessels 102 and 103 are discharged, the operation of the pump 153 is stopped and the changeover valves 161 and 163 are closed. Therefore, the supply of water to the second vessels 102 and 103 is stopped. As a result, all of the shielding materials are discharged from the second vessels 102 and 103.

When the shielding materials in the second vessels 102 and 103 are discharged, the second vessels 102 and 103 are taken down. Then, after the plurality of shielding material filled jackets 105 is taken out of the first vessel 101, the first vessel 101 is taken down. Accordingly, the first radiation-shielding device 100 is removed. Similarly, the second radiation-shielding device 200 is removed. Here, all works are completed.

In this way, the radiation shielding method of the present embodiment includes the steps of providing the first radiation-shielded region A1 outside the nuclear reactor vessel 41, and moving the neutron flux detector 77 to the radiation-shielded region A1 from the nuclear reactor vessel 41, in order to shield the neutron flux detector 77 arranged inside the nuclear reactor vessel 41.

Therefore, the radiation-shielded region A1 is provided outside the nuclear reactor vessel 41 in advance, and the neutron flux detector 77 is moved into the radiation-shielded region A1 from the nuclear reactor vessel 41 through the thimble tube 68 and is shielded. Thus, the worker is not required to approach the neutron flux detector 77, and can easily shield the neutron flux detector 77, whereby the amount of radiation to which the worker is exposed can be sufficiently reduced, and the safety of the worker can be improved. Further, it is not necessary to cut off the neutron flux detector 77 and the thimble tube 68, and thus reuse is possible, resulting in contribution to cost reduction.

Further, in the radiation shielding method of the present embodiment, the nuclear reactor vessel 41 and the radiation-shielded region A1 are coupled with the curved conduit tube 65, and the neutron flux detector 77 is moved into the radiation-shielded region A1 from the nuclear reactor vessel 41 through the conduit tube 65. Therefore, the radiation in the radiation-shielded region A1 from the neutron flux detector 77 can be properly shielded by the curved conduit tube 65 by moving the neutron flux detector 77 in the nuclear reactor vessel 41 into the radiation-shielded region A1 through the curved conduit tube 65.

Further, in the radiation shielding method of the present embodiment, the periphery of the region is surrounded by the hollow vessels 102, 102, and 103, and the vessels 101 are filled with the shielding material filled jackets 105 in which a number of granular shielding materials 104 are accommodated, so that the radiation-shielded region A1 is constructed. Therefore, the radiation-shielded region A1 that can shield the neutron flux detector 77 can be easily disposed in a short time by simply filling the plurality of shielding material filled jackets 105 in the vessels 101. In this case, by using the shielding material filled jacket 105 in which a number of shielding materials 104 are accommodated, handling of the granular shielding materials 104 becomes easily and the work can be simplified since a supply apparatus of the shielding material 104 and the like are not necessary.

Further, in the radiation shielding method of the present embodiment, the periphery of the region is surrounded by the hollow vessels 102, 102, and 103, and water and a number of granular shielding materials 104 are supplied to the vessels 102 and 103, so that the radiation-shielded region A1 is constructed. Therefore, the radiation-shielded region A1 that can shield the neutron flux detector 77 can be easily disposed by simply supplying the water and the granular shielding materials 104 to the vessels 102 and 103. In this case, the shielding materials 104 can be supplied after the vessels 102 and 103 are disposed. Therefore, the amount of radiation to which the worker is exposed can be sufficiently reduced. In addition, after the repair work is completed, water is supplied to the vessels 102 and 103, and a number of granular shielding materials 104 can be collected. Therefore, a tail-end process becomes easy, and the processing cost can be reduced by allowing the reuse of the shielding materials 104.

Further, in the radiation-shielding device of the present embodiment, the hollow vessels 102, 102, and 103 that form the radiation-shielded region A1 having a predetermined size by surrounding its periphery, and a plurality of shielding material filled jackets 105 in which a number of granular shielding materials 104 are housed in the vessel 101 are provided.

Therefore, by simply filling the plurality of shielding material filled jackets 105 in which a number of granular shielding materials 104 are housed in the hollow vessel 101, the radiation-shielded region A1 can be easily disposed, and the amount of radiation to which the worker is exposed can be sufficiently reduced. Further, the shielding materials 104 and the shielding material filled jackets 105 can be collected and reused. Therefore, an operating cost can be reduced.

Further, in the radiation-shielding device of the present embodiment, the first vessel 101 that constitutes the vertical wall of the radiation-shielded region A1, the second vessel 102 that constitutes the vertical wall of the radiation-shielded region A1, and the second vessel 103 that constitutes the roof of the radiation-shielded region A1 are provided, the plurality of vertical plates 111 are vertically arranged with a predetermined interval to form the first vessel 101, and the shielding material filled jacket 105 is filled among the plurality of vertical plates 111. Therefore, by constituting the first vessel 101 by the plurality of vertical plates 111, the structure can be simplified, and by filling the shielding material filled jacket 105 among the vertical plates 111, the vertical wall of the radiation-shielded region A1 can be easily constructed.

Further, in the radiation-shielding device of the present embodiment, the conduit tube 65 that penetrates the radiation-shielded region A1 and guides the neutron flux detector 77 and the thimble tube 68 is provided, and the penetrating groove 113, the vertical plate 111 of which the conduit tube 65 penetrates. Therefore, by providing the conduit tube 65 that the radiation-shielded region A1 penetrates, the neutron flux detector 77 can be easily guided to the radiation-shielded region A1, and by forming the penetrating groove 113 in the vertical plate 111, the conduit tube 65 can be easily guided to the radiation-shielded region A1.

Further, in the radiation-shielding device of the present embodiment, the second vessels 102 and 103 are filled with the plurality of granular shielding materials 104. Therefore, by simply filling the second vessels 102 and 103 with the granular shielding materials 104, the vertical wall and the roof of the radiation-shielded region A1 can be easily formed. In addition, after the completion of the repair work, water is supplied to the vessels 102 and 103 and a number of granular shielding materials 104 can be collected. Therefore, a tail-end process becomes easy, and the processing cost can be reduced by allowing the reuse of the shielding materials 104.

Further, the direction of processing a structure of the present embodiment includes the steps of providing the first radiation-shielded region A1 outside the nuclear reactor vessel 41 in order to shield the neutron flux detector 77 arranged in the nuclear reactor vessel 41, moving the neutron flux detector 77 into the radiation-shielded region A1 from the nuclear reactor vessel 41, and performing inspection/repair of the instrumentation nozzle 63 of the nuclear reactor vessel 41 after the neutron flux detector 77 is taken out of the nuclear reactor vessel 41.

Therefore, the radiation-shielded region A1 is provided outside the nuclear reactor vessel 41 in advance, and after the neutron flux detector 77 is moved into the radiation-shielded region A1 from the nuclear reactor vessel 41 and shielded, the instrumentation nozzle 63 is inspected/repaired. Therefore, the worker is not required to approach the neutron flux detector 77, and the neutron flux detector 77 can be easily shielded. The worker can safely work with the nuclear reactor vessel 41 after the neutron flux detector 77 is taken out, and the amount of radiation to which the worker is exposed can be sufficiently reduced.

Note that, in the above-described embodiment, the radiation-shielded region A1 is laid out by constructing the first radiation-shielding device 100 by the vessels 101, 102, and 103. However, the shape can be appropriately changed. That is, when the sides of the cavity 83 in which a plurality of conduit tubes 65 is arranged is concrete wall surfaces, the second vessels 102 may be omitted. While the first radiation-shielding device 100 is disposed on the floor surface of the cavity 83, the first radiation-shielding device 100 can be disposed at a corner part formed by the floor surface and vertical walls, or at the vertical wall.

In the above-described embodiment, the hollow first vessel 101 is constructed by vertically arranging the two vertical plates 111, in which a plurality of penetrating grooves 113 is formed, with a predetermined gap, and fixing the vertical plates by the four support frames 112. However, the first vessel 101 is not limited by this construction. For example, the plurality of penetrating grooves 113 may be formed to open downward or may be formed to laterally open along the horizontal direction. Further, the first vessel may be divided into upper and lower parts, and a vessel similar to the second vessel 102 may be arranged in the lower part and a vessel made of two vertical plates in which penetrating grooves are formed may be placed on the upper part. That is, the first vessel may have any shape as long as it has an opening part that the plurality of conduit tubes 65 penetrates, and can be filled with a plurality of shielding material filled jackets.

While, in the above-described embodiment, the neutron flux detector 77 and the thimble tube 68 are applied as bodies to be shielded, the body to be shielded is not limited to these examples. Further, while the instrumentation nozzle 63 is applied as the part to be processed, any part in the nuclear reactor vessel 41 can be processed.

Further, in the above-described embodiment, the structure is applied to the nuclear reactor vessel 41. However, the structure may be applied to the steam generator 13. Still further, the nuclear reactor is applied as a pressurized water reactor. However, a boiling-water reactor may be applied.

REFERENCE SIGNS LIST

41 Nuclear reactor vessel (structure)
63 Instrumentation nozzle (part to be processed)
64 In-core instrumentation guide tube
65 Conduit tube (pipe)
68 Thimble tube (body to be shielded)
77 Neutron flux detector (body to be shielded)
100 First radiation-shielding device
101 First vessel
102 and 103 Second vessel
104 Shielding material
105 Shielding material filled jacket
200 Second radiation-shielding device

The invention claimed is:

1. A radiation shielding method of shielding a body to be shielded arranged inside a nuclear reactor vessel, the method comprising:
providing a radiation-shielded region outside the nuclear reactor vessel; and
moving the body to be shielded into the radiation-shielded region from the nuclear reactor vessel,
wherein the providing includes providing a first radiation-shielded region on a wall surface of a cavity outside the nuclear reactor vessel and providing a second radiation-shielded region that surrounds a lower side of the nuclear reactor vessel,
wherein the providing the first radiation-shielded region includes disposing a first vessel constituting a vertical wall of the first radiation-shielded region and a second vessel constituting a roof of the first radiation-shielded region,
wherein the providing the second radiation-shielded region includes arranging a plurality of third vessels each having a shape in which a lower part is gradually increased in thickness to fill a gap between a cylindrical part of a concrete structure and the nuclear reactor vessel, closely side by side outside the nuclear reactor vessel along a circumferential direction, and arranging a plurality of fourth vessels each having a rod-shape to fill a gap between the nuclear reactor vessel and a support table supported by the concrete structure, closely side by side at the lower side of the nuclear reactor vessel to form a circle, and
the providing includes filling the first vessel with a plurality of shielding material filled jackets which are pouch-shape vessels whose shapes are changeable, and the plurality of shielding material filled jackets are filled with a plurality of granular shielding materials,
wherein the disposing the first vessel includes disposing two vertical plates at a certain distance in a direction perpendicular to a longitudinal direction of a plurality of conduit tubes, and forming a plurality of penetrating grooves opening upward along an up and down direction and aligned in a right and left direction through which the plurality of conduit tubes pass through in the respective vertical plates, and
the filling the first vessel with a plurality of shielding material filled jackets includes providing the plurality of shielding material filled jackets between the two vertical plates.

2. The radiation shielding method according to claim 1, wherein the nuclear reactor vessel and the first radiation-shielded region are coupled with a curved pipe, and the body to be shielded is moved into the first radiation-shielded region from the nuclear reactor vessel through the pipe.

3. The radiation shielding method according to claim 1, wherein the first radiation-shielded region is constructed by supplying the plurality of granular shielding materials to the second vessel along with a fluid.

4. A method of processing a nuclear reactor vessel, comprising
the radiation shielding method of claim 1; and
processing a part to be processed of the nuclear reactor vessel after the body to be shielded is taken out of the nuclear reactor vessel.

5. The method of processing a nuclear reactor vessel according to claim 4, wherein the nuclear reactor vessel and the first radiation-shielded region are coupled with a curved pipe, and after the body to be shielded is moved into the radiation-shielded region from the nuclear reactor vessel through the pipe, an inspection/repair work of the pipe is performed.

6. A radiation-shielding device comprising:
a first radiation-shielding device that provides a first radiation-shielded region on a wall surface of a cavity outside the nuclear reactor vessel and;
a second radiation-shielding device that provides a second radiation-shielded region that surrounds a lower side of the nuclear reactor vessel,
wherein the first radiation-shielding device includes a first vessel constituting a vertical wall of a first radiation-shielded region and a second vessel constituting a roof of the first radiation-shielded region,
wherein the second radiation-shielding device includes a plurality of third vessels each having a shape in which a lower part is gradually increased in thickness to fill a gap between a cylindrical part of a concrete structure and the nuclear reactor vessel and arranged closely side by side outside the nuclear reactor vessel along a circumferential direction, and a plurality of fourth vessels each having a rod-shape to fill a gap between the nuclear reactor vessel and a support table supported by the concrete structure and arranged closely side by side at the lower side of the nuclear reactor vessel to form a circle, and the first vessel having a plurality of shielding material filled jackets which are pouch-shape vessels whose shapes are changeable, and the plurality of shielding material filled jackets including a plurality of granular shielding materials, wherein the first vessel includes two vertical plates disposed at a certain distance in a direction perpendicular to a longitudinal direction of a plurality of conduit tubes, wherein the two vertical plates respectively having a plurality of penetrating grooves opening upward along an up and down direction and aligned in a right and left direction through which the plurality of conduit tubes pass through, and the plurality of shielding material filled jackets is provided between the two vertical plates.

7. The radiation-shielding device according to claim 6, wherein a plurality of pipes penetrating the first and second radiation-shielded regions and guiding the body to be shielded is provided, and a penetrating groove penetrated by the plurality of pipes is formed in the plurality of vertical plates.

8. The radiation-shielding device according to claim 6, wherein the second vessel is filled with the plurality of granular shielding materials.

* * * * *